US012756944B2

(12) United States Patent
Wang

(10) Patent No.: US 12,756,944 B2
(45) Date of Patent: Oct. 6, 2026

(54) IMAGE ACQUISITION METHOD, CARRIER DEVICE AND TARGET DEVICE OBTAINING DEVICE INFORMATION AND COLLECTING IMAGES OF AT LEAST TWO DIRECTIONS OUTSIDE A CARRIER DEVICE BASED ON THE DEVICE INFORMATION

(71) Applicant: Lenovo (Beijing) Limited, Beijing (CN)

(72) Inventor: Zefang Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 112 days.

(21) Appl. No.: 19/036,349

(22) Filed: Jan. 24, 2025

(65) Prior Publication Data

US 2025/0247632 A1 Jul. 31, 2025

(30) Foreign Application Priority Data

Jan. 31, 2024 (CN) ......................... 202410141195.5

(51) Int. Cl.
*H04N 5/335* (2011.01)
*B60R 1/23* (2022.01)
*H04N 23/90* (2023.01)

(52) U.S. Cl.
CPC ............... *H04N 23/90* (2023.01); *B60R 1/23* (2022.01); *B60R 2300/30* (2013.01)

(58) Field of Classification Search
CPC ...................................................... H04N 23/90
See application file for complete search history.

(56) References Cited

U.S. PATENT DOCUMENTS

2021/0406894 A1* 12/2021 Calvert .............. G06Q 20/4014

FOREIGN PATENT DOCUMENTS

| | | | | | |
|---|---|---|---|---|---|
| CN | 112419516 B | * | 7/2022 | ............ | G07B 15/02 |
| WO | WO-2021262945 A1 | * | 12/2021 | ............ | H04N 23/90 |
| WO | WO-2023231360 A1 | * | 12/2023 | ............ | G06Q 20/40 |

* cited by examiner

*Primary Examiner* — Gary C Vieaux
(74) *Attorney, Agent, or Firm* — ANOVA LAW GROUP, PLLC

(57) ABSTRACT

An image acquisition method includes obtaining device information of an electronic device. The electronic device includes a first image acquisition apparatus, and the first image acquisition apparatus is configured to collect an image of a direction outside the electronic device. The method further includes obtaining a target image according to the device information and based on a second image acquisition apparatus performing image collection outside a carrier device. The second image acquisition apparatus is arranged at the carrier device and configured to collect images of at least two directions of the carrier device, and the carrier device including a carrying space.

14 Claims, 4 Drawing Sheets

IMAGE ACQUISITION METHOD, CARRIER DEVICE AND TARGET DEVICE OBTAINING DEVICE INFORMATION AND COLLECTING IMAGES OF AT LEAST TWO DIRECTIONS OUTSIDE A CARRIER DEVICE BASED ON THE DEVICE INFORMATION

CROSS-REFERENCE TO RELATED APPLICATION

The present disclosure claims priority to Chinese Patent Application No. 202410141195.5, filed on Jan. 31, 2024, the entire content of which is incorporated herein by reference.

TECHNICAL FIELD

The present disclosure is related to the smart terminal and vehicle networking technology field and, more particularly, to an image acquisition method and a device.

BACKGROUND

When using a vehicle, users often need to take photos/scan codes of the outside from the inside the vehicle. In related technologies, users generally take photos/scan codes by extending terminal devices such as cell phones out of the carrier device or through the transparent medium from inside. For example, users take photos/scan codes by extending the terminal devices such as cell phones out of the vehicle windows or through the vehicle windows from inside the vehicle. However, with this method, the operation is not convenient for the user, the efficiency of taking photos/scanning codes is low, the image quality is poor, and the process is time-consuming.

SUMMARY

An aspect of the present disclosure provides an image acquisition method. The method includes obtaining device information of an electronic device. The electronic device includes a first image acquisition apparatus, and the first image acquisition apparatus is configured to collect an image of a direction outside the electronic device. The method further includes obtaining a target image according to the device information and based on a second image acquisition apparatus performing image collection outside a carrier device. The second image acquisition apparatus is arranged at the carrier device and configured to collect images of at least two directions of the carrier device, and the carrier device including a carrying space.

An aspect of the present disclosure provides an image acquisition method. The method includes sending device information of an electronic device to a target device. The electronic device includes a first image acquisition apparatus configured to collect an image of a direction outside the electronic device. The target device is arranged on a carrier device including a carrying space and a second image acquisition apparatus. The second image acquisition apparatus is configured to collect images of at least two directions outside the carrier device. The device information is used to cause the target device to obtain a target image. The target image is obtained based on the second image acquisition apparatus performing image collection outside the carrier device.

An aspect of the present disclosure provides a target device including one or more processors and one or more memories. The one or more memories store at least one group of computer instruction sets that, when executed by the one or more processors, cause the one or more processors to obtain device information of an electronic device. The electronic device includes a first image acquisition apparatus, and the first image acquisition apparatus is configured to collect an image of a direction outside the electronic device. The one or more processors are further configured to obtain a target image according to the device information and based on a second image acquisition apparatus performing image collection outside a carrier device. The second image acquisition apparatus is arranged at the carrier device and configured to collect images of at least two directions of the carrier device, and the carrier device includes a carrying space.

An aspect of the present disclosure provides a carrier device including a target device. The target device includes one or more processors and one or more memories. The one or more memories store at least one group of computer instruction sets that, when executed by the one or more processors, cause the one or more processors to obtain device information of an electronic device. The electronic device includes a first image acquisition apparatus, and the first image acquisition apparatus is configured to collect an image of a direction outside the electronic device. The one or more processors are further configured to obtain a target image according to the device information and based on a second image acquisition apparatus performing image collection outside a carrier device. The second image acquisition apparatus is arranged at the carrier device and configured to collect images of at least two directions of the carrier device, and the carrier device includes a carrying space.

An aspect of the present disclosure provides an electronic device, including one or more memories and one or more processors. The one or more memories store at least one group of computer instruction sets that, when executed by the one or more processors, cause the one or more processors to send device information of an electronic device to a target device. The electronic device includes a first image acquisition apparatus configured to collect an image of a direction outside the electronic device. The target device is arranged on a carrier device including a carrying space and a second image acquisition apparatus. The second image acquisition apparatus is configured to collect images of at least two directions outside the carrier device. The device information is used to cause the target device to obtain a target image. The target image is obtained based on the second image acquisition apparatus performing image collection outside the carrier device.

DETAILED DESCRIPTION OF THE EMBODIMENTS

The technical solutions of embodiments of the present disclosure are described in detail below in conjunction with the accompanying drawings of embodiments of the present disclosure. Apparently, the described embodiments are merely some embodiments of the present disclosure, not all embodiments. Based on embodiments in the present disclosure, all other embodiments obtained by those skilled in the art without creative efforts shall be within the scope of the present disclosure.

When using a carrier device such as a vehicle, users often need to take photos or scan codes (e.g., scanning QR codes for payment) outside from inside the carrier device. Due to the obstruction caused by a carrier structure, such as a vehicle frame, a shooting direction/angle can be limited. Thus, the users may need to extend terminal devices such as cell phones outside the carrier device to take photos/scan codes or adjust the shooting position/angle of the terminal device such as the cell phone to take photos/scan codes inside the carrier device through the transparent medium (e.g., a vehicle window) of the carrier device. The first approach is dangerous, a suitable direction/angle of the terminal device extended outside the carrier device cannot be ensured to be suitable, which affects the image effect and user experience. With the latter approach of taking photos/scanning codes through the transparent medium like the vehicle window, the image effect can be affected due to the reflection of the transparent medium or dirt and debris on the transparent medium. In addition, using the terminal device such as the cell phone to take photos/scan codes of the outside the carrier device from inside the carrier device such as the vehicle can be inconvenient for the user, have low efficiency, have poor image quality, and be time-consuming.

Based on this, embodiments of the present disclosure provide an image acquisition method and a related device to solve the above technical problems in related technologies. Thus, the efficiency and image quality of taking photos/scanning codes outside the carrier device can be improved, the user operation can be simplified, and the operation time can be reduced.

Figure 1:
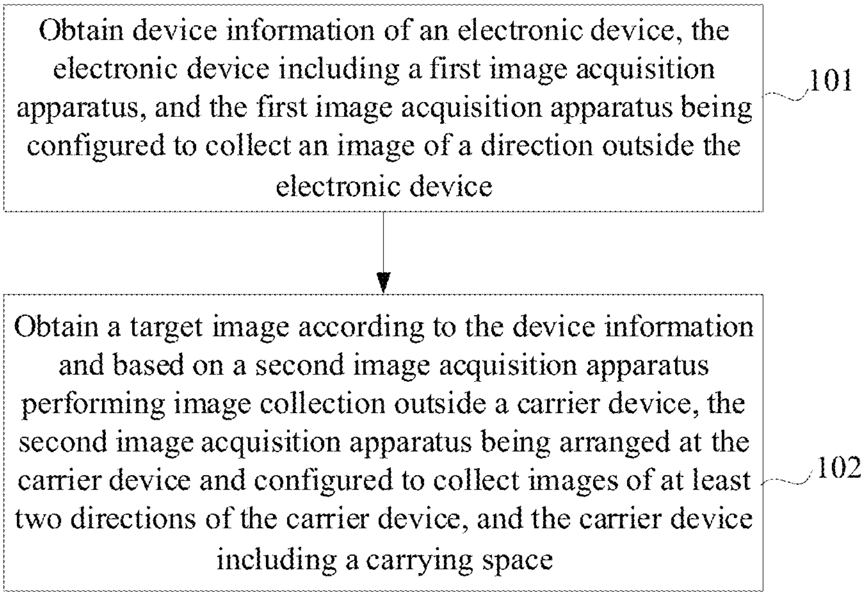
FIG. 1 illustrates a schematic flowchart of an image acquisition method applied to a carrier device or a target device of the carrier device according to some embodiments of the present disclosure.

FIG. 1 illustrates a schematic flowchart of the image acquisition method according to some embodiments of the present disclosure. The image acquisition method can be applied to a carrier device or a target device of the carrier device. The carrier device can include, but is not limited to, a vehicle, a ship, an aircraft (e.g., an airplane), a room, or any devices or objects with internal space and support capability. The target device arranged in the carrier device may not be limited to a processing device/a control device arranged at the carrier device with computation capability, such as a vehicle onboard computer, a central control device of a ship or airplane, etc. The processing device/control device can be an integral member of the carrier device or independent of the carrier device to be deployed or mounted at a corresponding position of the carrier device.

As shown in FIG. 1, the image acquisition method of embodiments of the present disclosure applied to the carrier device or the target device in the carrier device includes the following processing steps.

At step 101, device information of an electronic device is obtained. The electronic device includes a first image acquisition apparatus configured to collect an image in one direction outside the electronic device.

The electronic device can include, but is not limited to, a terminal device having computational capability, such as a cell phone, a tablet, and a laptop.

The electronic device can include a first image acquisition apparatus arranged at a predetermined position of the electronic device and configured to collect an image in one direction outside the electronic device. For example, the first image acquisition apparatus can include a rear camera or a front camera of the cell phone, which are arranged at a corresponding position on the rear side of the cell phone or a corresponding position on the front side of the cell phone. The rear camera and the front camera each can collect an image in one direction (a direction facing by the rear side or front side of the cell phone.

The one direction can be the direction corresponding to the center of the first image acquisition apparatus, that is, the direction faced by the imaging center of the first image acquisition apparatus in the photographing field of view of the first image acquisition apparatus.

In an application scenario of the method of the present disclosure, when using the carrier device such as the vehicle, the user can take photos or scan codes toward the outside the carrier device through the electronic device. For example, the user needs to take photos or scan QR codes (for payment) toward the outside the vehicle through a smartphone.

For the above application scenario, to solve the issues of inconvenient operation, lower efficiency of taking photos/scanning codes, poor image quality, and time-consuming, in embodiments of the present disclosure, the carrier device can cooperate with the electronic device such as the cell phone of the user to implement the image acquisition task required by the user taking photos or scanning codes toward outside the carrier device based on the image acquisition of the image acquisition apparatus of the carrier device.

The device information of the electronic device can be first obtained from the carrier device or the target device of the carrier device. The device information can be used to obtain a target image according to the carrier device or the target device of the carrier device. The target image can be the image that needs to be collected by the electronic device of the user from the outside the carrier device, e.g., taking photos or scanning QR codes toward the outside the vehicle.

In some embodiments, obtaining the device information of the electronic device can include obtaining target space information of the first image acquisition apparatus of the electronic device. In some embodiments, the device information of the electronic device can include the target space information of the first image acquisition apparatus. The target space information can be used to represent the target direction corresponding to the first image acquisition apparatus. The target direction can be the direction faced by the first image acquisition apparatus such as the camera of the electronic device, e.g., the direction faced by the front camera or rear camera of the cell phone in the photographing field of view.

In some embodiments, the attitude of the electronic device such as the cell phone of the user can be detected through an attitude sensor such as a gravity sensor or a gyroscope to obtain the device attitude information output by the sensor. The device attitude information can include but is not limited to a first angle of the device plane of the electronic device such as the cell phone relative to each coordinate axis of the 3D coordinate system. Thus, according to the first angle of the device plane relative to each coordinate axis of the 3D coordinate system, a second angle of the target direction (e.g., the direction facing by the front/rear camera) corresponding to the first image acquisition apparatus relative to each coordinate axis of the 3D coordinate system can be calculated. The second angle can be used as the target space information of the first image acquisition apparatus of the electronic device. The target direction corresponding to the first image acquisition apparatus can be characterized based on the second angles.

In some other embodiments, obtaining the device information of the electronic device can include obtaining the target application information. In some embodiments, the device information of the electronic device can be the target application information. The target application information can be used to characterize that the electronic device calls the first image acquisition apparatus through the target application. The target application information can include but is not limited to operation information of the related operation performed on the target application to call the first image acquisition apparatus. The target application can include an application such as the payment application or traffic application that requires the first image acquisition apparatus of the electronic device to be called.

Taking the payment application as an example, the target application information can include startup operation information (by starting up the 2D code scanning assembly to call the camera of the electronic device to perform image collection on the 2D code to scan the 2D code to make a payment) of the user performed by the user on the 2D code scanning assembly of the payment application of the electronic device. The start-up operation information can characterize that the electronic device is calling the first image acquisition apparatus through the payment application, e.g., call the rear camera of the smartphone.

In some embodiments, the target space information of the first image acquisition apparatus of the electronic device can be obtained. The target application information can be obtained too. The two pieces of information can be used as the device information of the electronic device obtained in step 101. Then, the target image can be obtained (the image needs to be collected by the electronic device of the user from outside the carrier device) according to the carrier device or the target device of the carrier device.

At 102, the target image is obtained according to the device information. The target image is obtained by the second image acquisition apparatus performing the image collection on the outside the carrier device. The second image acquisition apparatus is arranged on the carrier device. The carrier device includes a carrier space. The second image acquisition apparatus can collect the images in at least two directions outside the carrier device.

The at least two directions can include the direction corresponding to the center of the second image acquisition apparatus. That is, the direction facing the center of the imaging plane of the second image acquisition apparatus in the photographing filed of view of the second image acquisition apparatus.

The image collection capability of the second image acquisition apparatus can be greater than the image collection capability of the first image acquisition apparatus. For example, the second image acquisition apparatus can collect images in at least two directions outside the carrier device. Since the first image acquisition apparatus only collects the image in one direction outside the electronic device, when the first image acquisition apparatus is configured to collect the image in the external direction of the carrier device, only the image in the one direction outside the carrier device can be collected.

In embodiments of the present disclosure, the external direction of the electronic device can be the external direction of the electronic device represented by the one direction outside the electronic device in the specification. In some other embodiments, the external direction of the electronic device represented by the at least two directions outside the carrier device can be the direction away from the carrier device not the direction where the external surface of the carrier device is.

In some embodiments, the target image can correspond to images of one or a plurality of directions that can be collected by the second image acquisition apparatus. In some other embodiments, the target image can also correspond to at least a partial image area of the image collected by the second image acquisition.

In some embodiments, the second image acquisition apparatus can be arranged on an outer surface of the carrier device. The imaging surface of the second image acquisition apparatus can face the outside the carrier device, and the second acquisition apparatus can be moved and rotated to cause the imaging surface to face the outside the carrier device. Then, the second image acquisition apparatus can collect the image of the corresponding direction outside the carrier device. In some other embodiments, the second image acquisition apparatus is not arranged on the outer surface of the carrier device. With the arrangement position/arrangement method, the second image acquisition apparatus can collect the images of the corresponding directions outside the carrier device. For example, the camera can be embedded in the vehicle body frame. The imaging surface of the camera can be arranged to face the outside the vehicle, and a see-through apparatus can be arranged at the corresponding position of the vehicle body frame on the outer side of the imaging surface of the camera.

In some embodiments, one second image acquisition apparatus can be provided. The one second image acquisition apparatus can be a normal camera (e.g., a red-green-blue (RGB) camera) arranged at the carrier device with a changeable position/direction or a panorama camera. The normal camera can include a corresponding a position/direction change control apparatus. The required position/direction change can be controlled for the normal camera through the position/direction change control apparatus. Then, the one normal camera can collect images of the at least two directions outside the carrier device, or based on the photographing features of a plurality of directions and large field of view of the panorama camera, the panorama camera can collect the images of the at least two directions outside the carrier device.

In some other embodiments, a plurality of second image acquisition apparatuses (two or more) can be provided. Each second image acquisition apparatus can be configured to collect images of one or more than one direction outside the carrier device (e.g., each second image acquisition apparatus being a normal RGB camera or a panorama camera). In some embodiments, if a single second image acquisition apparatus can collect the images of one direction outside the carrier device, the image collection capability of at least two directions outside the camera device can be provided based on at least two second image acquisition apparatuses. If the single second image acquisition apparatus can collect the images of more than one directions outside the carrier device, the image collection capability of at least two directions outside the camera device can be provided based on one or more than one second image acquisition apparatuses.

That is, one or a plurality of second image acquisition apparatuses can be provided, which is not limited.

In some embodiments, when a plurality of second image acquisition apparatuses are provided, different second image acquisition apparatuses can be arranged at different positions on the outer surface of the carrier device, respectively. For example, a plurality of RGB cameras can be arranged 360° around the outer surface of the vehicle body. Meanwhile, the RGB cameras can be arranged on the outer surfaces at the top and/or bottom of the vehicle body to collect images of different directions outside the vehicle.

Figure 2:
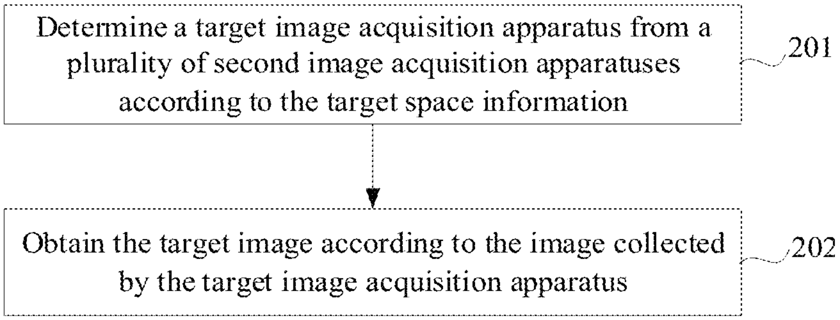
FIG. 2 illustrates a schematic flowchart of obtaining a target image based on device information according to some embodiments of the present disclosure.

In some embodiments, when the plurality of second image acquisition apparatuses are provided, when the obtained device information of the electronic device is the target space information of the first image acquisition apparatus, as shown in FIG. 2, obtaining the target image according to the device information includes the following steps.

At 201, a target image acquisition apparatus is determined from the plurality of second image acquisition apparatuses according to the target space information.

The image collection direction of the target image acquisition apparatus can match the target direction.

The image collection direction of the target image acquisition apparatus matching the target direction can mean that the image collection direction of the target image acquisition apparatus is same as the target direction, or the image collection direction of the target image acquisition apparatus has a deviation from the target direction, the deviation not achieving the set deviation. In some embodiments, by satisfying any one situation, the image collection direction of the target image acquisition apparatus can be considered to match the target direction.

One or a plurality of target image acquisition apparatuses can be provided, which is not limited. When the plurality of target image acquisition apparatuses are provided, the image collection direction of each target image acquisition apparatus can match the target direction. For example, the image collection direction of each target image acquisition apparatus can have a certain deviation from the target direction, and the deviation does not reach the set deviation.

In step 201, one or a plurality of second image acquisition apparatuses having the image collection direction matching the target direction of the first image acquisition apparatus represented by the target space information can be determined from the plurality of second image acquisition apparatuses and can be used as one or a plurality of target image acquisition apparatuses.

At 202, the target image is obtained according to the image collected by the target image acquisition apparatus.

Based on determining the target image acquisition apparatus, the target image can be obtained according to the target image acquisition apparatus. The image in the corresponding direction outside the carrier device can be collected according to the target image acquisition apparatus to obtain the target image required by the electronic device.

When one target image acquisition apparatus is provided, the original image collected by the one target image acquisition apparatus or a partial image area of the original image can be used as the target image. In some other embodiments, certain image processing can be performed on the original image collected by the one target image acquisition apparatus, e.g., filtering to remove noise, image enhancement, etc. The processed image or a partial image area of the processed image can be used as the target image. For example, the original environmental image photographed by the one target image acquisition apparatus or the denoised image obtained after performing noise removal on the original environmental image can be used as the target image. Alternatively, the original image QR code area of the original QR code image photographed by the one target acquisition apparatus or the QR code area after the noise removal can be used as the target image.

When a plurality of target image acquisition apparatuses are provided, the images collected by the plurality of target image acquisition apparatuses or some areas of the images can be stitched/fused to obtain the target image. In some embodiments, the original images collected by the plurality of target image acquisition apparatuses or some areas of the original images can be directly stitched/fused. In some other embodiments, certain image processing (e.g., filtering to remove noise and image enhancement) can be performed on the original image collected by the target image acquisition apparatuses or some areas of the original images, and the processed images can be then stitched/fused.

In some embodiments, before stitching/fusing the images/some image areas to be stitched/fused, the images/some image areas can be aligned.

For example, the image collection directions of two target image acquisition apparatuses each can match the target direction of the first image acquisition apparatus with a deviation from the target direction within the set deviation. The images collected by the target image acquisition apparatuses can be aligned, and the aligned two images can be stitched to obtain the target image.

In some embodiments, when the plurality of target image acquisition apparatuses are provided, the images collected by the target image acquisition apparatuses or some image areas can be used as the target image. The target images or some image areas of the target images can be stitched/fused through a terminal device such as a user cell phone to obtain the final image that the user needs to collect outside the carrier device such as the vehicle.

Figure 3:
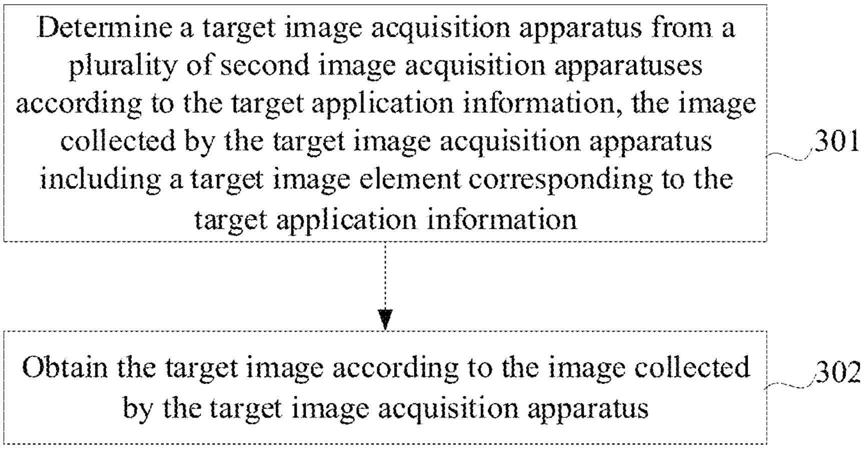
FIG. 3 illustrates another schematic flowchart of obtaining a target image based on device information according to some embodiments of the present disclosure.

In some embodiments, when the plurality of second image acquisition apparatuses are provided, and the obtained device information of the electronic device is the target application information, as shown in FIG. 3, obtaining the target image according to the device information includes the following steps.

At 301, the target image acquisition apparatus is determined from the plurality of second image acquisition apparatuses according to the target application information. The image collected by the target image acquisition apparatus includes a target image element, and the target image element corresponds to the target application information.

Different from the target image acquisition apparatus in steps 201 and 202, the target image acquisition apparatus is the second image acquisition apparatus with the image collected by the plurality of second image acquisition apparatuses including the target image element. The second image acquisition apparatus capable of collecting the target image element can be determined from the plurality of second image acquisition apparatuses as the target image acquisition apparatus. For example, the camera capable of photographing the QR code can be determined from the plurality of cameras at the vehicle body as the target camera.

The target image element can correspond to the target application information. After obtaining the target application information, the carrier device or the target device of the carrier device can determine the target application currently used by the electronic device of the user. Then, the required target image element can be determined according to the target application. The target image element is not limited to an image element such as a QR code, vehicle plate, and road sign, which is determined as needed. For example, if the target application information is the related application information of the payment application, the target application currently used by the user electronic device can be determined to be the payment application. The target image element can be correspondingly determined as the QR code (for payment). If the target application information is the related application information of a traffic management application, the target image element can be the vehicle plate.

One or a plurality of target image acquisition apparatuses can be provided, which is not limited.

At 302, the target image is obtained according to the images collected by the target image acquisition apparatuses.

Based on determining the target image acquisition apparatus, similar to step 202, in step 302, the target image is obtained according to the image collected by the target image acquisition apparatus. In some embodiments, according to the images of the corresponding direction outside the carrier device collected by the target image acquisition apparatus, the target image required by the electronic device can be obtained.

When a single target image acquisition apparatus is provided, in step 302, the target image element (e.g., a QR code, vehicle plate, road sign, etc.) in the original image collected by the single target image acquisition apparatus can be identified and extracted. The extracted target image element can be used as the target image. In some other embodiments, certain image processing can be performed on the original image collected by the single target image acquisition apparatus, e.g., filtering to remove noise, and image enhancement. Then, the target image element can be identified and extracted from the image obtained after the image processing. The target image element can be used as the target image. In practical applications, the target image element can be extracted from the original image collected by the single target image acquisition apparatus, and the image processing such as the noise removal and image enhancement can be performed on the image area of the extracted target image element. The target image element after the image processing can be used as the target image.

When the plurality of target image acquisition apparatuses are provided, the target image elements of the images collected by the plurality of target image acquisition apparatuses can be stitched or fused to obtain the target image. The target image elements of the original images collected by the plurality of target image acquisition apparatuses can be directly stitched/fused, or certain image processing (e.g., filtering to remove noise and image enhancement) can be performed on the original images collected by the plurality of target image acquisition apparatuses, and then the target image elements of the processed images can be stitched/fused. In some embodiments, the target image elements of the images collected by the target image acquisition apparatuses can be extracted first, and the image processing such as noise removal and image enhancement can be performed on the target image elements. Then, the target image elements after the image processing can be stitched/fused.

In some embodiments, before stitching/fusing the target image elements to be stitched/fused, the target image elements can be aligned first.

For example, the images collected by two target image acquisition apparatuses can include QR codes (entire QR code information or partial QR code information). The images collected by the two target image acquisition apparatuses or the QR codes of the images can be aligned. Then, the portion of the aligned QR code image area satisfying a clarity condition can be stitched/fused to obtain the QR code image satisfying the clarity condition.

The obtained target image can be the image collected outside the carrier device required by the electronic device, e.g., a vehicle external environmental image needs to be photographed or a QR code image needs to be scanned by the user using the cell phone.

In some embodiments, when the plurality of target image acquisition apparatuses are provided, the images collected by the target image acquisition apparatuses or the target image elements of the images can be used as the target images. Then, the terminal device such as the user cell phone can be configured to perform at least a part of the processing such as identification, extraction, stitching/fusion of the target image elements on the target images to obtain the final image that the user needs to collect outside the carrier device such as the vehicle.

In practical applications, the target image is obtained in connection with embodiments of FIG. 2 and FIG. 3. In some embodiments, the obtained device information of the electronic device can include the target space information of the first image acquisition apparatus and the target application information of the electronic device. According to the target space information and the target application information, the target image acquisition apparatus can be determined from the plurality of second image acquisition apparatuses. The image collection direction of the target image acquisition apparatus can match the target direction corresponding to the first image acquisition apparatus represented by the target space information. Moreover, the image collected by the target image acquisition apparatus can include the target image element corresponding to the target application information. Based on this, the target image can be obtained according to the image collected by the target image acquisition apparatus.

In some embodiments, one or a plurality of target image acquisition apparatuses can be provided, which is determined as needed. When one target image acquisition apparatus is provided, the image area corresponding to the target image element can be cropped from the target image acquisition apparatus. The cropped image area or the image area obtained by performing processing such as noise removal and image enhancement on the cropped image area can be used as the target image. When a plurality of target image acquisition apparatuses are provided, the image areas (or image areas after the noise removal and image enhancement) of the target image elements of the images collected by the plurality of target image acquisition apparatuses can be stitched/fused to obtain the target image.

For the case that one second image acquisition apparatus is provided, if the one second image acquisition apparatus is a normal camera (RGB camera) that is position/direction changeable arranged at the carrier device, position movement and/or direction rotation control can be performed on the normal camera through the position/direction change control apparatus to adjust the direction and view angle of the normal camera collecting the image. Thus, the image collection direction of the normal camera can match the target direction corresponding to the first image acquisition apparatus of the electronic device, or the collection target (e.g., QR code) can be included in the field of view for the image collection of the normal camera to collect the image that needs to be collected outside the carrier device by the electronic device based on the normal camera of the carrier device.

In the case that one second image acquisition apparatus is provided, if the one second image acquisition apparatus is the panorama camera arranged at the carrier device, the image area of the corresponding direction matching the target direction of the first image acquisition apparatus of the electronic device can be cropped from the image collected by the panorama camera. Alternatively, the image area of the target image element matching the target application information of the electronic device can be cropped from the image collected by the panorama camera as the target image.

When using the carrier device such as the vehicle, the user may need to take photos/scan codes outside the carrier device through the electronic device. For example, the user may need to take photos/scan codes outside the vehicle using the smartphone. Based on the method of the present disclosure, the user is inside the carrier device and can control the target direction of the first image acquisition apparatus (e.g., the orientation of the rear camera) of the electronic device by moving the electronic device such as the smartphone to correspondingly control the target image acquisition apparatus of the second image acquisition apparatuses to collect images. Thus, the image collected based on the target image acquisition apparatus can obtain the target image that needs to be collected by the electronic device outside the carrier device. Alternatively, the operation can be performed on the target application of the electronic device (e.g., start up the code scanning control button of the payment application) to control the target image acquisition apparatus (e.g., the camera that can collect the QR code of the cameras on the vehicle body) of the second image acquisition apparatuses of the carrier device based on the target application information to collect images. Then, the target image that needs to be collected by the electronic device outside the carrier device can be obtained based on the image collected by the target image acquisition apparatus. In some embodiments, the above methods can be combined to control the target image acquisition apparatus of the second image acquisition apparatuses of the carrier device to collect the image. In practical applications, suitable methods can be selected as needed.

In summary, in the image acquisition method applied to the carrier device or the target device of the carrier device of embodiments of the present disclosure, the device information of the electronic device can be obtained, and the target image that needs to be collected by the electronic device outside the carrier device can be obtained according to the device information. For example, the device information can be the image that is photographed or the QR code that is scanned by the electronic device such as the user cell phone outside the vehicle. For the user inside the carrier device, the corresponding second image acquisition apparatus of the carrier device can be called to perform image collection by sending the device information of the electronic device to the carrier device or the target device of the carrier device through the electronic device to obtain the target image according to the collected image. Thus, the user inside the carrier device does not need to extend the electronic device outside the carrier device to perform the image collection and also does not need to perform the image collection outside the carrier device through the transparent medium (e.g., vehicle glass) of the carrier device. Therefore, the series of issues of the related technology when the photo taking/code scanning is required outside the carrier device such as the vehicle can be overcome, the efficiency and image quality of the user taking photos/scanning codes outside the carrier device such as vehicle can be effectively improved, the user operation can be simplified, and the operation time can be reduced.

Figure 4:
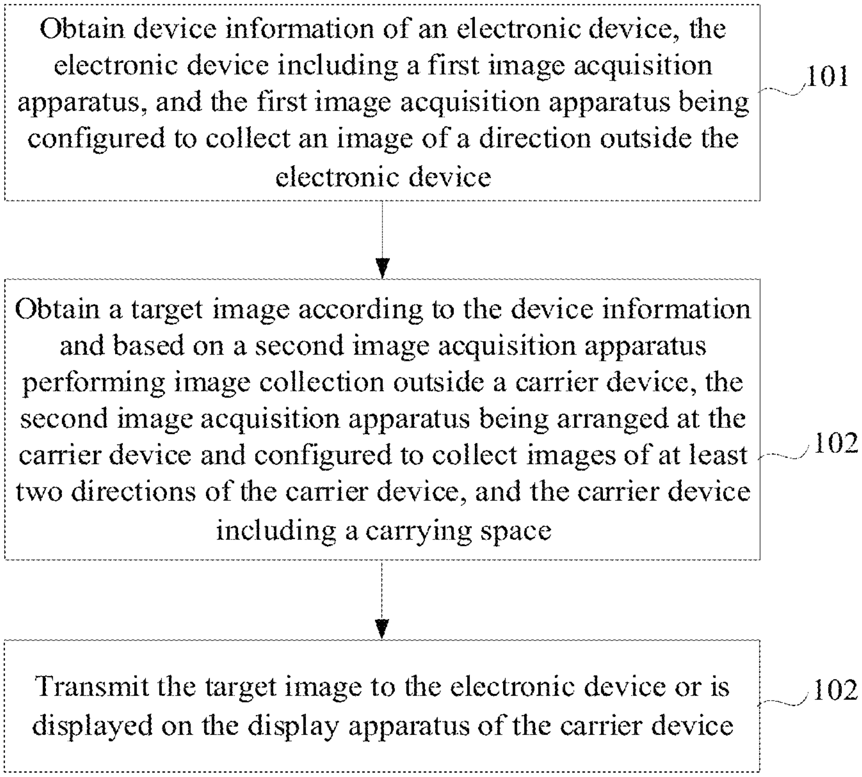
FIG. 4 illustrates a schematic flowchart of another image acquisition method applied to a carrier device or a target device of the carrier device according to some embodiments of the present disclosure.

In some embodiments, FIG. 4 illustrates a schematic flowchart of an image acquisition method applied to a carrier device or a target device of the carrier device according to some embodiments of the present disclosure. After step 102, the method further includes the following steps.

At 103, the target image is transmitted to the electronic device or is displayed on the display apparatus of the carrier device.

In some embodiments, after the carrier device or the target device of the carrier device obtains the target image, the target image can be transmitted to the electronic device such as the user cell phone to allow the electronic device to apply the target image. For example, the display interface of the electronic device can display the target image to show the user, or the electronic device can perform required processing on the target image and display corresponding application information.

For example, the on-vehicle computer can transmit the obtained vehicle external environmental image (i.e., the target image obtained by the target device) to the user cell phone inside the vehicle. The vehicle external environmental image can be displayed on the display interface of the user cell phone inside the vehicle for the user. For another example, the on-vehicle computer can transmit the obtained QR code image (e.g., the target image obtained by the target device) to the user cell phone inside the vehicle. The target application of the cell phone can perform the QR code identification to display corresponding application information to realize the required application, such as the payment application identifying the QR code to display the corresponding payment information to complete the payment.

The transmission method can be wired or wireless, which is not limited.

In some other embodiments, after the carrier device or the target device of the carrier device obtains the target image, the target image can be directly displayed on the display apparatus of the carrier device. Thus, the user inside the carrier device can display the target image on the display apparatus of the carrier device for the related application.

For example, the vehicle external environmental image or QR code image obtained based on the image collection can be displayed on the display screen of the on-vehicle computer. Thus, the user can view, save, or transmit (e.g., transmit to the user cell phone through the wired or wireless method) the displayed vehicle external environmental image. Alternatively, the user can use the cell phone to scan and identify the QR code to display the corresponding application information to complete the required application. For example, the user can scan the QR code displayed on the on-vehicle computer through the cell phone to display the corresponding payment information on the cell phone to compute the payment.

In some embodiments, after the carrier device or the target device of the carrier device obtains the target image, by transmitting the target image to the electronic device or displaying the target image on the display apparatus of the carrier device, the user inside the carrier device can perform the required application on the target image, e.g., viewing the target image displayed on the electronic device of the display apparatus of the carrier device, or scanning the QR code displayed on the display apparatus of the carrier device for payment.

Figure 5:
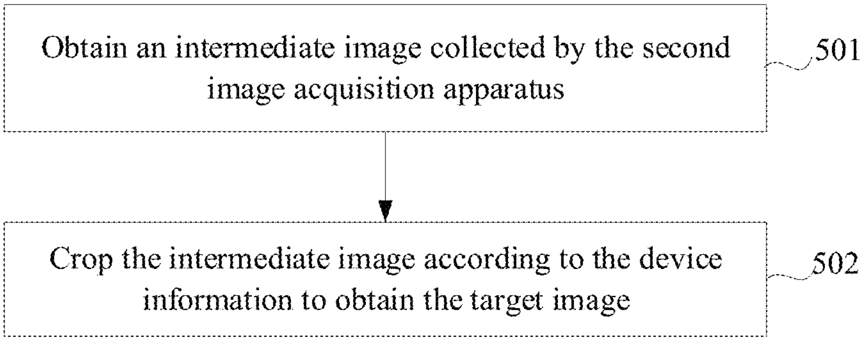
FIG. 5 illustrates another schematic flowchart of obtaining a target image based on device information according to some embodiments of the present disclosure.

In some embodiments, as shown in FIG. 5, step 102 of the image acquisition method applied to the carrier device or the target device of the carrier device includes the following steps.

At 501, an intermediate image collected by the second image acquisition apparatus is obtained.

At 502, the intermediate image is cropped according to the device information to obtain the target image.

In some embodiments, the intermediate image collected by the second image acquisition apparatus can be a large image, such as a panoramic image collected by the panoramic camera arranged on the outer surface of the vehicle.

When the device information is the target space information of the electronic device, according to the target direction corresponding to the first image acquisition apparatus represented by the target space information, e.g., the orientation of the rear camera of the user cell phone represented by the target space information, the image area (e.g., small image) in the corresponding direction can be cropped from the large image as the target image, or the cropped image area in the corresponding direction can be used as the target image after being performed with processing such noise removal and image enhancement.

When the device information is the target application information of the electronic device, the target image elements can be identified from the large image, and the image area (small image) of the target image elements can be cropped as the target image. Alternatively, the cropped image area can be used as the target image after being performed with processing such as noise removal and image enhancement. For example, the QR code for payment corresponding to the payment application information can be identified in the panoramic image collected by the panorama camera, and the QR code image area can be cropped as the target image.

After the target image is obtained, the target image can be transmitted to the electronic device or displayed on the display apparatus of the carrier device to support the user to perform related application on the target image. For example, the user can view the vehicle external environmental image displayed on the user cell phone or the on-vehicle computer, or the QR code displayed on the on-vehicle computer can be scanned by the user cell phone to complete the payment.

In embodiments of the present disclosure, the intermediate image collected by the second image acquisition apparatus can be obtained by the carrier device, and the target image can be obtained by cropping the intermediate image according to the device information of the electronic device. The user inside the carrier device can call the second image acquisition apparatus of the carrier device to perform image collection by sending the device information of the electronic device to the carrier device or the target device of the carrier device through the electronic device. Then, the target image required by the user can be obtained by cropping the intermediate image according to the device information. The user inside the carrier device does not need to extend the electronic device out of the carrier device to perform image collection, and the user also does not need to perform the image collection through the transparent medium (e.g., vehicle glass) of the carrier device toward the outside the carrier device. Thus, the series of issues of the related technology when the photo taking/code scanning is required outside the carrier device such as the vehicle can be overcome, the efficiency and image quality of the user taking photos/scanning codes outside the carrier device such as a vehicle can be effectively improved, the user operation can be simplified, and the operation time can be reduced.

Embodiments of the present disclosure further provide an image acquisition method applied to the electronic device. The electronic device can include but is not limited to a terminal device with computational capability, such as a smartphone, a tablet, a laptop, etc.

The image acquisition method applied to the electronic device at least includes sending the device information of the electronic device to the target device.

The electronic device can include the first image acquisition apparatus. The first image acquisition apparatus can collect an image of a specific direction outside the electronic device. The target device can be arranged at the carrier device. The carrier device can have a carrying space. The carrier device can include the second image acquisition apparatus. The second image acquisition apparatus can be configured to collect images of at least two directions outside the carrier device. The device information can be used to allow the target device to obtain the target image. The target image can be obtained by the second image acquisition apparatus performing image collection outside the carrier device.

The target device can include but is not limited to a processing device/control device having the computational capability of the carrier device such as a vehicle, a ship, an aircraft (e.g., airplane), etc., e.g., an on-vehicle computer or a central control device of the ship/airplane.

Sending the device information of the electronic device to the target device can include sending the target space information of the first image acquisition apparatus of the electronic device to the target device, the target space information being used to represent the target direction corresponding to the first image acquisition apparatus, and sending the target application information of the electronic device to the target device, the target application information representing that the electronic device is calling the first image acquisition apparatus through the target application.

The target device of the carrier device can obtain the device information of the electronic device, e.g., obtaining the target space information and/or the target application information of the electronic device. The target device can obtain the target image according to the obtained target space information and/or the target application information. For the process of the target device obtaining the target image according to the device information such as the target space information and/or target application information, reference can be made to the above, which is not repeated.

After the target device of the carrier device obtains the target image, in some embodiments, the target image can be transmitted to the electronic device. The electronic device can obtain the transmitted target image and perform the required application on the target image, e.g., displaying the obtained vehicle external environmental image for the user to view, or identifying the obtained QR code and displaying the corresponding payment interface for the user to complete the required payment.

In some embodiments, the target device of the carrier device can also display the target image on the display apparatus of the carrier device, e.g., on the display screen of the on-vehicle computer for the user to view the image or scan the QR code to complete the payment.

The image acquisition method applied to the electronic device of embodiments of the present disclosure can cooperate with the image acquisition method applied to the carrier device or the target device of the carrier device of the above embodiments. For the detailed implementation process, reference can be made to the description of the image acquisition method applied to the carrier device or the target device of the carrier device above, which is not repeated.

In the image acquisition method applied to the electronic device of embodiments of the present disclosure, the corresponding second image acquisition apparatus of the carrier device can be called to perform the image collection by sending the corresponding device information of the electronic device to the target device through the electronic device. Then, the target image can be obtained according to the collected image. Thus, the user inside the carrier device does not need to extend the electronic device out of the carrier device to perform the image collection outside the carrier device. The user inside the carrier device also does not need to perform the image collection through the transparent medium (e.g., vehicle glass) of the carrier device toward the outside the carrier device. Thus, the series of issues of the related technology when the photo taking/code scanning is required outside the carrier device such as the vehicle can be overcome, the efficiency and image quality of the user taking photos/scanning codes outside the carrier device such as a vehicle can be effectively improved, the user operation can be simplified, and the operation time can be reduced.

Embodiments of the present disclosure further provide a target device. The target device can be arranged at the carrier device. The carrier device can include a carrying space and a second image acquisition apparatus. The second image acquisition apparatus can be configured to collect images of at least two directions outside the carrier device.

The carrier device can include a power apparatus configured to move the carrier device.

Figure 6:
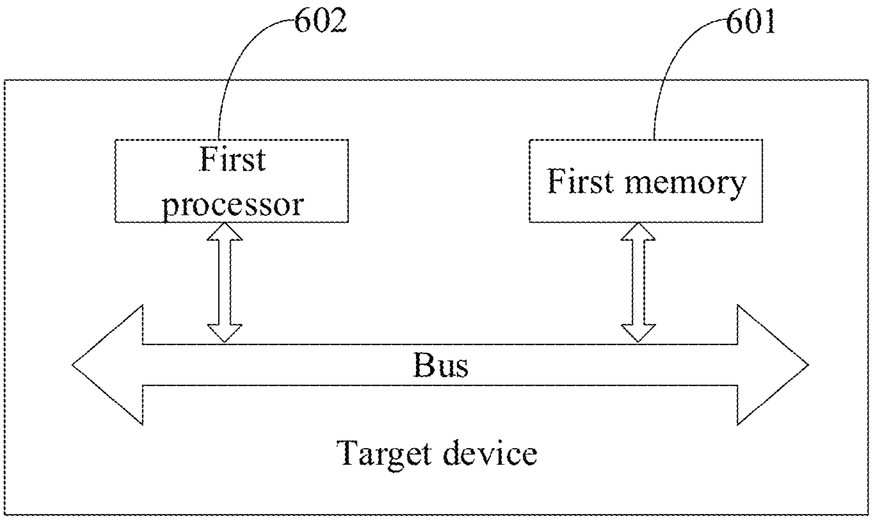
FIG. 6 illustrates a schematic structural diagram of a target device according to some embodiments of the present disclosure.

As shown in FIG. 6, the target device includes a first memory 601 and a first processor 602.

The first memory 601 can be configured to store at least a group of computer instruction sets. The computer instruction set can be implemented by a computer program.

The first processor 602 can be configured to perform the instruction set stored in the first memory to implement the image acquisition method applied to the target device of the carrier device above.

The first processor 602 can include a Central Processing Unit (CPU), Application-Specific Integrated Circuit (ASIC), Digital Signal Processor (DSP), Field-Programmable Gate Array (FPGA), or other programmable logic devices.

In some embodiments, the target device can also include a display apparatus and/or a display interface capable of being connected to an external display apparatus.

In some embodiments, the target device can further include a camera assembly and/or can be connected to an external camera assembly.

In addition, the target device can further include a communication interface and a communication bus. The first memory, the first processor, and the communication interface can communicate with each other through the communication bus.

The communication interface can be configured for the communication between the target device and other devices. The communication bus can include a Peripheral Component Interconnect (PCI) bus or Extended Industry Standard Architecture (EISA) bus. The communication bus can be divided into an address bus, data bus, and control bus.

Figure 7:
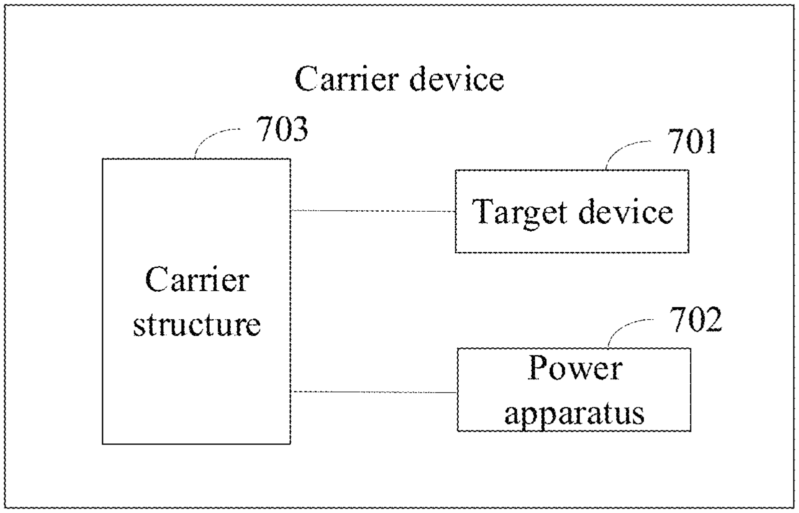
FIG. 7 illustrates a schematic structural diagram of a carrier device according to some embodiments of the present disclosure.

Embodiments of the present disclosure further provide a carrier device. As shown in FIG. 7, the carrier device includes the target device 701, a power apparatus 702 configured to cause the carrier device to move, and a carrier structure 703 including a carrying space.

The carrier device can include but is not limited to a vehicle, ship, and aircraft (airplane) having the carrying space.

The power apparatus 702 of the carrier device can include but is not limited to an engine and/or electric motor of the carrier device such as the vehicle, ship, and aircraft, which is capable of providing power to drive the carrier device to move.

The carrier structure 703 can include but is not limited to a vehicle body frame and a machine body frame of the carrier device such as the vehicle, ship, and aircraft.

The target device 701 can include but is not limited to a device having the processing/control capability such as the on-vehicle computer and central control device of the carrier device such as the vehicle, ship, and aircraft. The target device 701 can at least include the first memory and the first processor. The first memory can be configured to at least store a group of computer instruction sets. The first processor can be configured to perform the instruction set stored in the first memory to realize the image acquisition method applied to the target device of the carrier device above.

Figure 8:
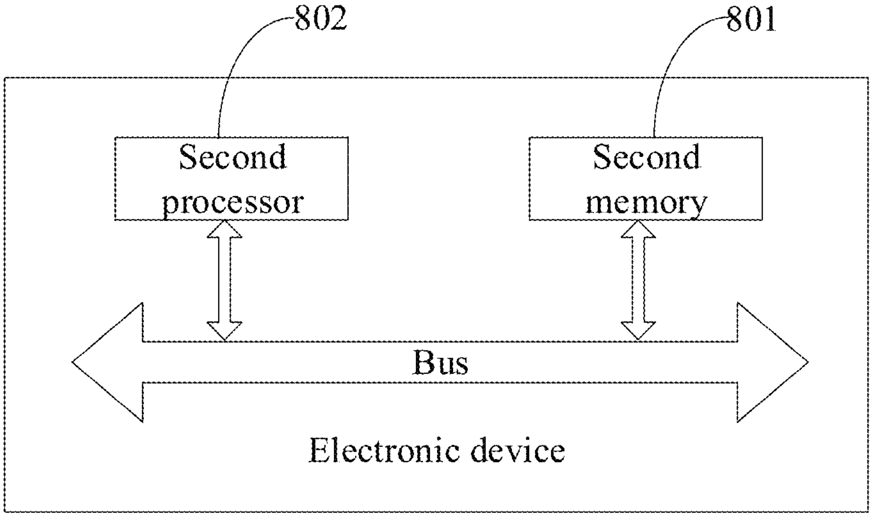
FIG. 8 illustrates a schematic structural diagram of an electronic device according to some embodiments of the present disclosure.

Embodiments of the present disclosure further provide an electronic device. As shown in FIG. 8, the electronic device includes a second memory 801 and a second processor 802.

The second memory 801 can be configured to store a computer instruction set.

The computer instruction set can be implemented by the computer program.

The second processor 802 can be configured to perform the computer instruction set in the second memory to realize the image acquisition method applied to the electronic device above.

The second processor 802 can include a Central Processing Unit (CPU), Application-Specific Integrated Circuit (ASIC), Digital Signal Processor (DSP), Field-Programmable Gate Array (FPGA), or other programmable logic devices.

In some embodiments, the electronic device can further include a display apparatus and/or a display interface capable of being connected to the external display apparatus.

In some embodiments, the electronic device can further include a camera assembly and/or be connected to an external camera assembly.

In addition, the electronic device can further include a communication interface and a communication bus. The memory, the processor, and the communication interface can communicate with each other through the communication bus.

The communication interface can be configured for the communication between the electronic device and other devices. The communication bus can include a Peripheral Component Interconnect (PCI) bus or Extended Industry Standard Architecture (EISA) bus. The communication bus can be divided into an address bus, data bus, and control bus.

Embodiments of the present disclosure are described in a progressive manner. Each embodiment focuses on the difference from other embodiments. Same or similar parts among embodiments of the present disclosure can be referred to each other.

To facilitate the description, the system or apparatus can be functionally divided into modules or units, which are described separately. When implementing the present disclosure, the functions of the units can be implemented in one or a plurality of pieces of software or hardware.

Based on the above description, those skilled in the art can understand that the present disclosure can be implemented by software plus a necessary and general hardware platform. Based on this understanding, the essence or a part having creative contribution of the technical solutions can be implemented in the form of a software product. The computer software product can be stored in a storage medium, e.g., ROM/RAM, magnetic discs, and optical discs, and include several instructions to cause one computer device (e.g., a personal computer, server, or network device) to perform the method of embodiments or a part of embodiments of the present disclosure.

In the specification, the relationship terms such as first, second, third, and fourth, etc., can be used to distinguish one entity of operation from another entity or operation and do not necessarily imply or suggest any actual relationship or sequence between these entities or operations. Furthermore, the terms "comprise," "include," or any other variations thereof are intended to cover non-exclusive inclusion. Thus, a process, method, item, or device that includes a series of elements does not only include those elements but also include other elements that are not explicitly listed, or elements inherent to such process, method, item, or device. When there are no more limitations, an element defined by the statement "comprising a . . . " does not exclude the presence of other identical elements in the process, method, item, or device that includes the element.

The above are some embodiments of the present application. For those skilled in the art, several modifications and improvements can be made without departing from the principle of the present disclosure, and these modifications and improvements should be within the scope of the present disclosure.

What is claimed is:

1. An image acquisition method comprising:

obtaining device information of an electronic device, the electronic device including a first image acquisition apparatus, and the first image acquisition apparatus being configured to collect an image of a direction outside the electronic device; and obtaining a target image according to the device information and based on a second image acquisition apparatus performing image collection outside a carrier device, the second image acquisition apparatus being arranged at the carrier device and configured to collect images of at least two directions outside the carrier device, and the carrier device including a carrying space.

2. The method according to claim 1, wherein obtaining the device information of the electronic device includes at least one of:

obtaining target space information of the first image acquisition apparatus, the target space information being used to represent a target direction corresponding to the first image acquisition apparatus; or obtaining target application information, the target application information representing that the electronic device is calling the first image acquisition apparatus via a target application.

3. The method according to claim 2, wherein obtaining of the target image according to the device information includes:

determining a target image acquisition apparatus from a plurality of second image acquisition apparatuses according to the target space information, an image collection direction of the target image acquisition apparatus matching the target direction; and obtaining the target image according to the image collected by the target image acquisition apparatus.

4. The method according to claim 2, wherein obtaining the target image according to the device information includes:

determining a target image acquisition apparatus from a plurality of second image acquisition apparatuses according to the target application information, the image collected by the target image acquisition apparatus including a target image element corresponding to the target application information; and obtaining the target image according to the image collected by the target image acquisition apparatus.

5. The method according to claim 1, further comprising at least one of:

transmitting the target image to the electronic device; or displaying the target image on a display apparatus of the carrier device.

6. The method according to claim 1, wherein obtaining the target image according to the device information includes:

obtaining an intermediate image collected by a second image acquisition apparatus; and performing a cropping operation on the intermediate image according to the device information to obtain the target image.

7. A carrier device comprising:

a power apparatus configured to cause the carrier device to move;

a carrier structure including a carrying space; and a target device including:

one or more processors; and one or more memories storing at least one group of computer instruction sets that, when executed by the one or more processors, cause the one or more processors to:

obtain device information of an electronic device, the electronic device including a first image acquisition apparatus, and the first image acquisition apparatus being configured to collect an image of a direction outside the electronic device; and obtain a target image according to the device information and based on a second image acquisition apparatus performing image collection outside the carrier device, the second image acquisition apparatus being arranged at the carrier device and configured to collect images of at least two directions outside the carrier device.

8. A target device comprising:

one or more processors; and one or more memories storing at least one group of computer instruction sets that, when executed by the one or more processors, cause the one or more processors to:

obtain device information of an electronic device, the electronic device including a first image acquisition apparatus, and the first image acquisition apparatus being configured to collect an image of a direction outside the electronic device; and obtain a target image according to the device information and based on a second image acquisition apparatus performing image collection outside a carrier device, the second image acquisition apparatus being arranged at the carrier device and configured to collect images of at least two directions outside the carrier device, and the carrier device including a carrying space.

9. The target device according to claim 8, wherein the carrier device includes a power apparatus configured to drive the carrier device to move.

10. The target device according to claim 8, wherein the one or more processors are further configured to perform at least one of:

obtaining target space information of the first image acquisition apparatus, the target space information being used to represent a target direction corresponding to the first image acquisition apparatus; or obtaining target application information, the target application information representing that the electronic device is calling the first image acquisition apparatus via a target application.

11. The target device according to claim 10, wherein the one or more processors are further configured to:

determine a target image acquisition apparatus from a plurality of second image acquisition apparatuses according to the target space information, an image collection direction of the target image acquisition apparatus matching the target direction; and obtain the target image according to the image collected by the target image acquisition apparatus.

12. The target device according to claim 10, wherein the one or more processors are further configured to:

determine a target image acquisition apparatus from a plurality of second image acquisition apparatuses according to the target application information, the image collected by the target image acquisition apparatus including a target image element corresponding to the target application information; and obtain the target image according to the image collected by the target image acquisition apparatus.

13. The target device according to claim 8, wherein the one or more processors are further configured to perform at least one of:

transmitting the target image to the electronic device; or displaying the target image on a display apparatus of the carrier device.

14. The target device according to claim 8, wherein the one or more processors are further configured to:

obtain an intermediate image collected by a second image acquisition apparatus; and perform a cropping operation on the intermediate image according to the device information to obtain the target image.

* * * * *